Patented Mar. 18, 1924.

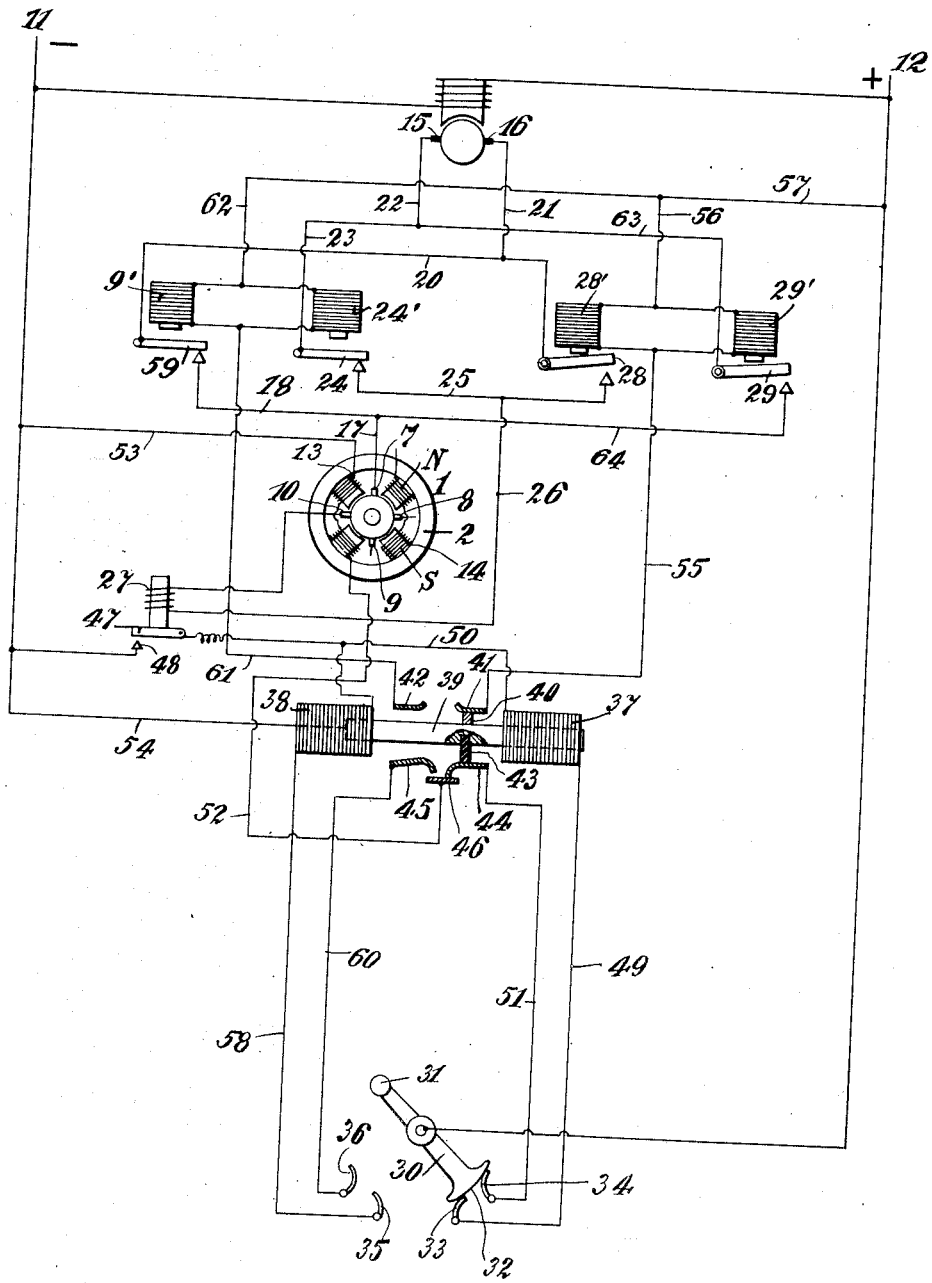

1,487,270

UNITED STATES PATENT OFFICE.

SAMUEL W. RUSHMORE, OF PLAINFIELD, NEW JERSEY.

ELEVATOR CONTROL SYSTEM.

Application filed August 25, 1922. Serial No. 584,172.

*To all whom it may concern:*

Be it known that I, SAMUEL W. RUSH-MORE, a citizen of the United States, and resident of Plainfield, in the county of Union and State of New Jersey, have invented certain new and useful Improvements in Elevator Control Systems, of which the following is a specification.

My present invention relates primarily to electric elevator control systems and installations of the general class described in my co-pending application, resulting in Patent No. 1,427,644, granted Aug. 29, 1922, although it has a broader range of application to electric power systems and more especially to systems of the type in the normal operation of which, rapid changes or reversals of current are or may be effected at will.

It is an object of the invention to provide a system of the above type in which safety and efficiency of operation is substantially assured without dependence upon the skill of the operator.

Another object is to provide a system of the above type, the operation of which shall be flexible and which shall not engender harmful sparking.

My invention is preferably embodied in an electric elevator system, in which a manually operated switch controls the speed or direction of rotation of the motor through electromagnetic control relays.

In the preferred embodiment, the power current supplied to the motor preferably from a generator, controls a protective relay for interrupting the operation of the control relay circuit through which reversal of the motor is effected, so that only after the current in the power circuit has been reduced to a predetermined extent, will the manual reversing operation become effective. In the preferred embodiment, the manual switch at all times controls the field circuit of the generator, so that said circuit will be interrupted upon reversal operation, to effect rapid reduction of the current flowing through the power circuit, to bring about the release of the protective relay which must precede the reversal of the motor.

According to another feature of the invention, the generator armature is connected to the motor armature by two normally closed circuits, one for determining operation of the motor in clockwise and the other in counter-clockwise direction. The control relay circuit includes contactors operated by solenoids for opening one or the other of the circuits at will, said solenoids in turn controlled by the energization of one or the other of a pair of control solenoids. The protective relay already referred to, or a distinct relay, functions in the preferred embodiment to prevent opening of the closed circuit until after the companion contactor, previously opened, has again closed the circuit.

In the accompanying drawing, the figure shows a diagrammatic view of an application of the system.

In the drawing, the numeral 1 designates a generator having a field frame 2 and integral therewith there are alternating north and south poles marked N and S, respectively. In the specific embodiment, there are four poles and these are preferably equally spaced 90 degrees from each other. The armature is provided with four brushes 7, 8, 9, and 10, said brushes being spaced equidistantly 90 degrees from each other, each brush being disposed half way between adjoining field poles. The generator 1 is separately excited from a pair of mains 11 and 12. For this purpose two parallel field circuits, 13 and 14, are provided, each corresponding to one of the field sections and connected to the main 11, the field circuits being completed to the main 12 in a manner explained below.

In the type of dynamo just described, current may pass to or from one external circuit through the brushes 7 and 10, and to or from another separate and independent circuit, through the brushes 8 and 9. It will be seen by reference to my prior Patent, No. 587,163, and the application above-referred to, in which the characteristics of the generator are described, that it has the property of maintaining the different external circuits which it may supply, substantially independent of each other, so that increase or decrease or elimination of load from one external circuit, will have substantially no effect on the remaining external circuits.

It is only for simplicity of illustration that the generator is shown on the drawings with but two magnetic field sections, comprising four poles and four brushes as above-described. It is well known, however, that generators of the type described may be constructed with any number of pairs of poles within the limits of practical use and that consequently any number of elevators may derive their operating current from a single generator of the type referred to, the latter having a pair of poles and a pair of brushes for each elevator.

The type of generator, shown and described regardless of the number of poles, will be designated by me a "multi-voltage generator" and each individual segment or portion of the generator that supplies one of the independent external power-consuming circuits will be designated a "generator section."

I have shown in the drawings a single elevator motor connected to be operated from one of the sections of the multi-voltage generator, it being understood that a similar power-translating device may be operated from the other section or sections thereof. The generator brushes are connected to the motor brushes 15, 16, to establish the power circuit when the system is in the condition shown in the drawing, through a circuit from generator brush 7, to conductors 17, 18, to contactor 59, conductors 20 and 21 to motor brush 16, through the motor armature and from motor brush 15, through conductors 22 and 23, contactor 24, conductors 25, 26, relay solenoid coil 27, to the other generator brush 10. The contactors 59 and 24 are electromagnetically controlled by solenoids 9' and 24', respectively, in turn, controlled in a manner to be described below. The contactors, as shown, are in operative position when the corresponding solenoids, as 9' and 24', are not energized. A similar circuit through contactors 28 and 29 is connected for supplying current through the motor in reverse direction, through a circuit generally similar to that set forth, which can easily be traced on the drawing.

The control operation is effected through a manual control switch 30 preferably in the elevator car, having a handle 31 and a brush contact 32 which may co-act with either contact 33 alone, or both contacts 33 and 34, at the right for controlling the operation in one direction or with similar contacts 35 and 36, at the left for controlling reverse direction, and is in neutral position when the car is to stand still.

The manual control switch, depending on its position, controls either solenoid 37 or solenoid 38, of a double solenoid relay, by which the position of a sliding plunger 39 is controlled. The plunger carries a contact 40 adapted to engage contact 41 or contact 42 depending on its operative position. It will be seen that there is no probability of the plunger 39 halting in a mid or neutral position and thus leaving open circuited or inoperative either the generator field circuit or both sets of the main circuit contactor opening coils for the reason that the excitation circuit through relay coil 37 or 38 must always be firmly established before the control switch 30 can establish circuit through field contacts 34 or 36. Even should the plunger 39 from some cause be allowed to rest in a mid or neutral position no harm could result because the gravity actuated main circuit contactor coils would then all be unexcited and thus the brushes of the constantly excited elevator motor would be effectually short-circuited to prevent any rapid movement of the elevator car. The plunger also carries an insulating rod 43 to contact spring finger 44 or 45 for forcing one or the other into contact with a fixed field controlling contact 46.

The coil 27 heretofore referred to, in the main power circuit, controls a protective relay switch contactor 47 which is gravity actuated to close against contact 48 unless the power circuit carries current sufficient to raise it.

In operation, to start the elevator, the operator turns switch handle 31 say to the left. Upon engagement of its wiping contact 32 with contact 33, circuit will be made from main 12 through switch arm 30, contact 33, conductor 49 and solenoid 37, through conductor 50, contactor 47 and conductor 48 to the main 11. The energized solenoid 37 will draw the plunger 39 toward it, to the position shown in the drawing in which the contact 40 engages spring arm 41 and the insulating rod 43 forces the spring contact 44 against fixed contact 46. When the switch arm 30, has, by its continued movement, passed into engagement with contact 34, circuit will be established from main 12, contact arm 30, contact 34, conductor 51 spring contact 44, fixed contact 46 and conductor 52 to the field coil 13, and through conductor 53, to the opposite main 11. The generator field is thereby energized. Concurrently with this operation, circuit will also be established from main 11, conductor 54, plunger 39, contacts 40, 41, conductor 55, through the two solenoids 28', 29', in parallel, and through conductors 56 and 57, to the opposite main 12. The energized solenoids 28', 29', will raise the corresponding contactors 28, 29, respectively, so that effective circuit connection is established from the generator to the motor, through a circuit, as follows: through generator brush 10, coil 27, conductors 26 and 25, contactor 24, conductors 23 and 22, to motor brush 15, through the motor armature motor brush 16 and through conductors 21 and 20, contactor 59 and conductor 18, to the other brush 7 of the generator.

While the power connection is on, the protective solenoid coil 27 is energized and maintains the protective relay contactor 47 raised as shown in the drawings to interrupt the circuit to the solenoid 37. The plunger 39 will therefore, remain in the position indicated, since there is no force to return it. There being the usual resistances (not shown) in series with the generator field, it will be understood that the position of the switch contact 30 may be varied at will to vary the current output of the generator section for varying the speed of the elevator motor, without in any way affecting the controlling solenoids.

In order to reverse the direction of the motor, the control switch 30 is shifted to contacts 35 and 36. In this operation, the generator field circuit which extends through switch arm 30 is first interrupted at contact 34. The generator field circuit is, however, not re-established at once upon completion of the manual reversing operation by engagement of the switch arm 30 with contacts 35, 36, since the power current in the coil 27 maintains contactor 47 raised and the circuit of relay 38 open. When the current in the power circuit has decreased by reason of the disconnection of the generator field, to an extent such that the coil 27 can no longer maintain the contactor 47 in elevated position, the latter will drop, whereupon the circuit is established from main 12 through switch 30, contact 35, conductor 58, relay 38, and conductor 59, contactor 47 and contact 48, to the other main 11.

The plunger 39, is, therefore, drawn toward the left to move contact 40 away from contact 41. In this operation, the circuits of solenoids 28' and 29', which pass through contact 41, are interrupted and the contactors 28 and 29 drop without appreciable time lag to re-establish circuit. The plunger 39 in its continued movement brings contact 40 into engagement with contact 42, and concurrently therewith insulating rod 43, which, near the beginning of the plunger movement, had released spring contact 44, forces the spring contact 45 against fixed contact 46. Thereupon the generator field circuit will be re-established from main 12 through switch 30, contact 36, conductor 60, contact 45, contact 46, conductor 52, through the field coil 13 and through conductor 53 to the other main 11. The plunger operation set forth further establishes circuit from main 11, to conductor 54, plunger 39, contacts 40, 42, to conductor 61 to energize the solenoids 9' and 24', and through conductors 62 and 57, to the opposite main 12 whereby the contactor 24 is raised, so that the current is supplied from the generator to the motor through contactors 28 and 29, which had previously dropped, as set forth. The power circuit will now be from generator brush 10 through solenoid 27, conductor 26, contactor 28 and conductor 21 to the motor brush 16, through the motor armature and from the opposite motor brush 15 through conductors 22 and 63, contactor 29 and conductors 64 and 17 to the other brush 7 of the generator. Thus the motor runs in the direction opposite that heretofore described corresponding to the connection shown in the drawing.

It will be seen that while the motor is running, there will be a considerable current flowing from the generator to the motor or a considerable re-generated current flowing from the motor to the generator, which will cause protective relay coil 27 to hold its armature, the contactor 47, away from contact 48, thus holding open the circuit from the switch contact 34 or 36, through relay coils 37 and 38, thereby rendering the relay inoperative for reversing the motor until the latter and the car have come substantially to rest. Thus, when the elevator is running at full speed in one direction, if the operator should suddenly throw the controller hard over for the reverse direction, no damage will result, for the reason that, although manual switch contacts will then be established for the reverse operation, the protective relay 27 will not function to close the relay circuit through which reversal is effected until after the working or re-generated current has fallen to a predetermined small value to permit dropping of contactor 47. Thus, should the controller be thrown hard over, the car will first come to a normal stop before the reversal can take place.

It will also be seen that the main line contactors, or reversing switches, 59, 24, 28 and 29, are normally closed and being controlled solely by the action of relay 37, 38, it is impossible for both pairs of contactors to be open at the same time. Therefore, there is no possibility of the opening of the main line circuit between the brushes of the elevator motor and the brushes of the generator, and the danger of racing of the motor or excessive arcing is avoided.

As the field of the elevator motor is constantly excited, it will also be impossible for the car to run away, even though the mechanical brakes or other protective devices should fail.

It will also be seen that when the controller is in neutral position or in position cutting off the excitation of the generator field, the constantly excited elevator motor is dead short circuited through the insignificant ohmic resistance of the four normally closed main line contactors.

I claim:

1. An electric power system comprising in combination, a power circuit including a generator having an armature and a field, and an electric motor operated therefrom, a reversing relay for said motor connected to control the generator field, a manual control switch for said reversing relay, and means controlled from said power circuit to prevent reversal of said relay upon operation of said manual switch, until the generator field has been first reduced to a predetermined value, following operation of said manual switch.

2. An electric power system comprising, in combination, a generator having an armature, a motor operated therefrom having an armature connected in circuit with the generator armature, said generator and said motor having separately excited fields, a reversing relay circuit for said motor, a manual control switch therefor, connected to control also the operative connection of the generator field, and means controlled from the power circuit to interrupt the reversing relay operating circuit, while the generator field is maintained under the control of said manual element, whereby upon operating the manual control switch, motor reversal will be deferred until the current in the power circuit has reduced to an extent sufficient to reconnect the power circuit for control by the relay circuit.

3. In an electric power system, in combination, a generator, a suitable field circuit therefor, a translating apparatus in circuit with said generator, electromagnetic reversing relay means for said translating apparatus, manually operated control means for said reversing switch, said reversing relay being connected in the generator field circuit to interrupt the latter during the reversing operation, and a protective relay energized by the main power circuit to interrupt the effectiveness of the reversing relay, whereby upon effecting a manual reversing operation, the translating apparatus will not be reversed until after the current in the power circuit has reduced to such extent as to release the protective relay for first restoring the effectiveness of the reversing relay.

4. An electric power system, comprising in combination, an electric generator, an electric motor operated therefrom, a manual switch, an electromagnetic relay circuit controlled thereby for governing the direction of rotation of said motor, said circuit including an electromagnet energized upon operation of the manual switch to establish an operative connection between the generator armature and the motor for rotation of the motor in one direction, a second electromagnet to be energized by a reversing operation of the manual switch to reverse the motor, and a protective relay energized from the power circuit to maintain the circuit of the electromagnet to be operated for reversal, open until after the current in the power circuit has reduced to a predetermined value.

5. An electric power system, comprising in combination, an electric generator, an electric motor operated therefrom, a manual switch, an electromagnetic relay circuit controlled thereby for governing the direction of rotation of said motor, said circuit including an electromagnet energized upon operation of the manual switch to establish an operative connection between the generator armature and the motor for rotation of the motor in one direction, and a second electromagnet to be energized by a reversing operation of the manual switch to reverse the motor.

6. In an electric power system, in combination, a generator, a motor driven thereby, electromagnetically operated contactors between said generator and said motor determining the direction of rotation of the latter, a control relay for controlling said contactors, a manually operated switch for controlling the operation of said control relay to govern the direction of rotation of the motor, and means controlled from the power circuit for preventing the energization of the control relay, until the current in said power circuit has reduced to a predetermined value.

7. In an electric power system, in combination, a generator, a motor driven thereby, a manual control and reversing switch and a pair of control solenoids alternatively energized in accordance with the position of said switch to determine the direction of motor rotation, contactor operating solenoids for establishing the power circuit between said generator and said motor, switch means operated by said control solenoids to effect closure of the field circuit of said generator, and concurrently therewith operative connection of said contactor operating solenoids, and a protective relay energized from the power circuit for preventing closure of the circuit to the idle control solenoid when the manual switch is reversed, whereby reversal of the motor cannot take place until after the current in the power circuit has reduced to a value sufficiently low to release the protective relay.

8. In an electric power system, in combination, a generator, a motor, two normally closed circuits connecting said generator to said motor, one for operation of the latter in clockwise and the other for operation in counter-clockwise direction and control means for energizing said generator and concurrently opening at will one or the other of said circuits to operate said motor in one or the other direction.

9. The combination set forth in claim 7, in which means is provided to prevent opening of the closed circuit until the open circuit has first been closed, whereby reversal of the motor takes place without substantial sparking.

10. In an electric power system, in combination, a generator, a motor, a pair of normally closed circuits connecting said generator and said motor, one for operation of the motor in clockwise and the other in counter-clockwise direction, a pair of control solenoids for governing the opening of said power circuits, manual switch means by which energization of one or the other of said control solenoids is effected, and a protective relay energized from the power circuit to prevent energization of the idle control solenoid until the current in said power circuit has reduced to a predetermined value, following reversal operation of the manual switch.

Signed at Plainfield, in the county of Union and State of New Jersey, this 22nd day of August, A. D. 1922.

SAMUEL W. RUSHMORE.